United States Patent [19]

Skerjanec et al.

[11] Patent Number: 4,561,925
[45] Date of Patent: Dec. 31, 1985

[54] FOIL WELDING DEVICE

[75] Inventors: Jože Škerjanec, Titovo Velenje; Stane Počivalnik, Šmartno Ob Paki, both of Yugoslavia

[73] Assignee: Gorenje Tovarna Gospodinjske Opreme N.Sol. O. Velenje, Titovo Velenje, Yugoslavia

[21] Appl. No.: 479,027

[22] Filed: Mar. 25, 1983

[30] Foreign Application Priority Data

Apr. 1, 1982 [YU] Yugoslavia .................... 726/82

[51] Int. Cl.$^4$ .................. B32B 31/00; B32B 19/02; B44C 7/04; B65B 7/06
[52] U.S. Cl. .................. 156/379.6; 156/379.8; 156/380.8; 156/494; 156/496; 156/576; 156/580; 156/583.9; 219/243; 219/246; 53/373; 53/405; 53/512

[58] Field of Search .............. 156/379.6, 380.2, 380.6, 156/380.8, 574, 576, 580, 583.1, 583.8, 583.9, 379.8, 494, 496; 219/243, 246; 53/373, 375, 405, 512

[56] References Cited

U.S. PATENT DOCUMENTS

| 3,731,054 | 5/1973 | Bair | 219/243 |
| 3,847,712 | 11/1974 | Hubbard | 219/243 |
| 4,418,512 | 12/1983 | Johnson | 53/512 |

Primary Examiner—Edward Kimlin
Assistant Examiner—Merrell C. Cashion, Jr.
Attorney, Agent, or Firm—Fleit, Jacobson, Cohn & Price

[57] ABSTRACT

The foil welding device for welding thermoplastic foil bags in its upright position enables the hanging of the bags onto the suction nozzle whereat the bag can be filled with food and thereafter air can be sucked therefrom and it can be welded, while in lying position the device is provided for welding bags from which air need not be sucked.

4 Claims, 6 Drawing Figures

FOIL WELDING DEVICE

The present invention pertains to a foil welding device, i.e. a device for welding thermoplastic foil bags intended for storing food. The welding device is intended for use in the household and enables the suction of air from the prior bags to welding.

Known is a foil welding device which enables the suction of air from the bag. For sealing the bag during the suction of air, an additional frame is used which prevents the access of air during the suction process.

The disadvantage of the abovementioned welding device lies in that its construction comprises two frames, i.e. a sealing frame and a welding frame, the embodiment of which is sophisticated and which also make difficult the handling of the device, besides, the sealing frame is superfluous in the case where the device is not used for the suction of air.

In some known embodiments of foil welding devices, the suction nozzles are positioned on the apparatus in a vertically movable manner such that during the suction process the thermoplastic foil bag is attached with the aid of a spring and a nozzle limiter. A disadvantage of these foil welding devices lies in the falling off of the connection tube between the nozzle and the suction pump is possible if the connection itself is not of top-quality, which raises the cost of the device. There also results improper operation because of insufficient sealing.

In foil welding devices which also enable suction, during suction the bag has to be hung on the device in vertical position in a order to prevent the suction of the contents of the bag into the pump. Accordingly, foil welding devices with a supporting plate are known, which are fixed to a wall, whereas in other embodiments of welding devices, the device itself is positioned on a socket, whereby a hanging position of the bag is made possible, the same socket being used as a cover covering the whole device.

The disadvantages of the above-mentioned solutions primarily lie in that the welding device, in a wall embodiment, cannot be arbitrarily displaced and the use of the cover as a socket represents a separate operation.

SUMMARY OF THE INVENTION

The aim of the invention is to eliminate all of the abovestated disadvantages, i.e. to provide a welding device which needs no additional welding frame, which will be embodied without a movable nozzle and accordingly, will evade the danger of the connecting tube falling off and which will make it possible so that the foil welding device could be positioned in an upright as well as in a lying position in dependence upon the circumstance whether air is to be sucked from the bag or not.

This aim was realized by a foil welding device according to the invention, the main characteristic of which lies in that for preventing access of air to the bag during suction, a sealing ledge with a strainer is used which is firmly attached to the housing of the device where the welding wire is fixed. A further characteristic of the novel construction being the firmly fixed suction nozzle on the housing of the device, having an on both sides an extension for hanging the bag. The construction of the device also makes possible the use of the device in a lying position as well as in an upright position whereas in either of these positions it has the same properties as welding devices intended for attachment to the wall.

BRIEF DESCRIPTION OF THE DRAWING

The object of the invention will further be described in detail and elucidated on the basis of the drawing. Therein show:

The foil welding device according to the present invention consists of a housing 1 and a cover 2 which is rotatingly mounted thereon. From the front view, there is on the operating surface 3 of the housing 1, at an angle of 60° with the base, on the left side of the housing, a suction nozzle 4. From the front ends of the lateral surfaces of the nozzle 4, a backwardly bent extension 5 protrudes on each side. As can be seen in FIG. 3 the front surface of the nozzle 4 comprises a suction slot 6 which is in communication with a suction pump (not shown). On the right side of the suction nozzle 4, there passes along the operating surface 3, a sealing ledge 7, having a T cross-section, while on the left side, near the left extension 5 on the surface 3, there is positioned an attachment 8 lying in the extension line of ledge 7. FIG. 4 shows the movably attached strainer 9 positioned on the sealing ledge 7, the left part of which can be lifted with regard to the ledge 7. In the down-pressed position the strainer snaps around the ledge 7.

Figure 1:
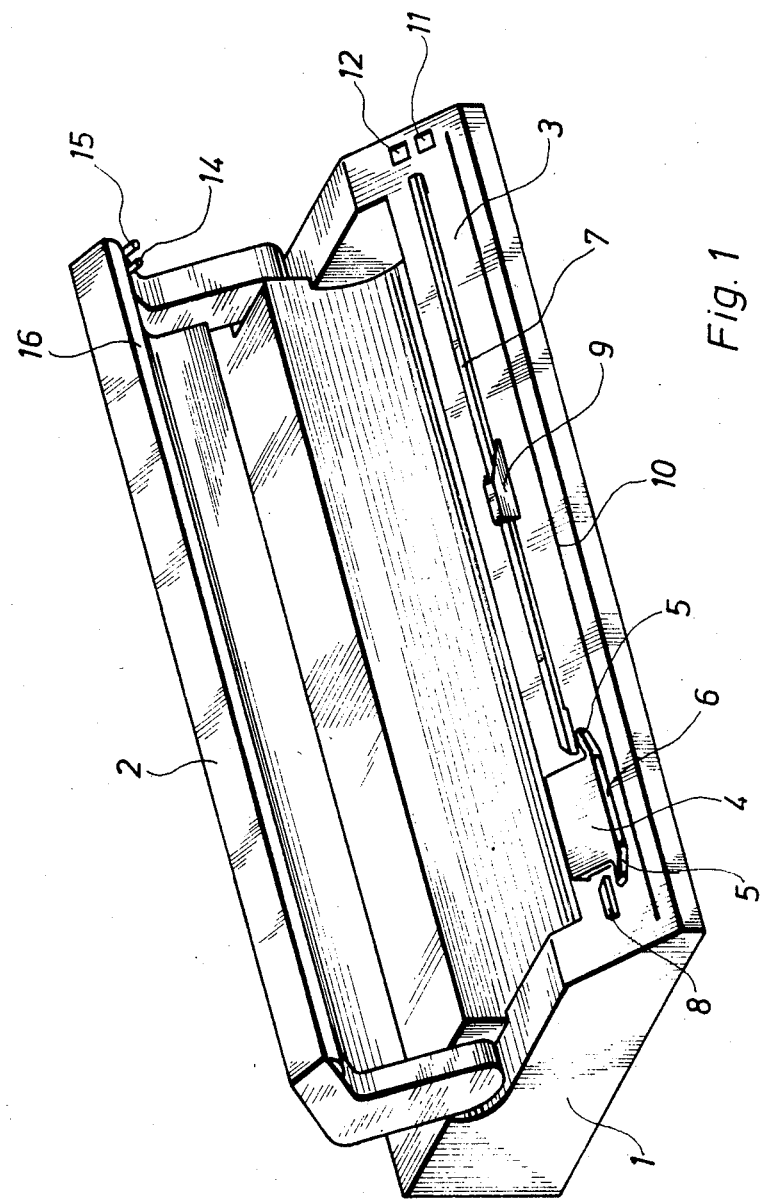
FIG. 1 illustrates a foil welding device in plan view with an extended cover

Below the suction nozzle 4 and the sealing ledge 7, on the operating surface 3, there is over the whole length of the welding device positioned a welding wire 10. On the right side of the end of the sealing ledge 7 there are on the operating surface 3 positioned two openings 11 and 12. Through the opening 11, a switch for switching in the welding wire 10 can be activated and through the opening 12 the switch for switching in the suction pump can be activated.

Figure 2:
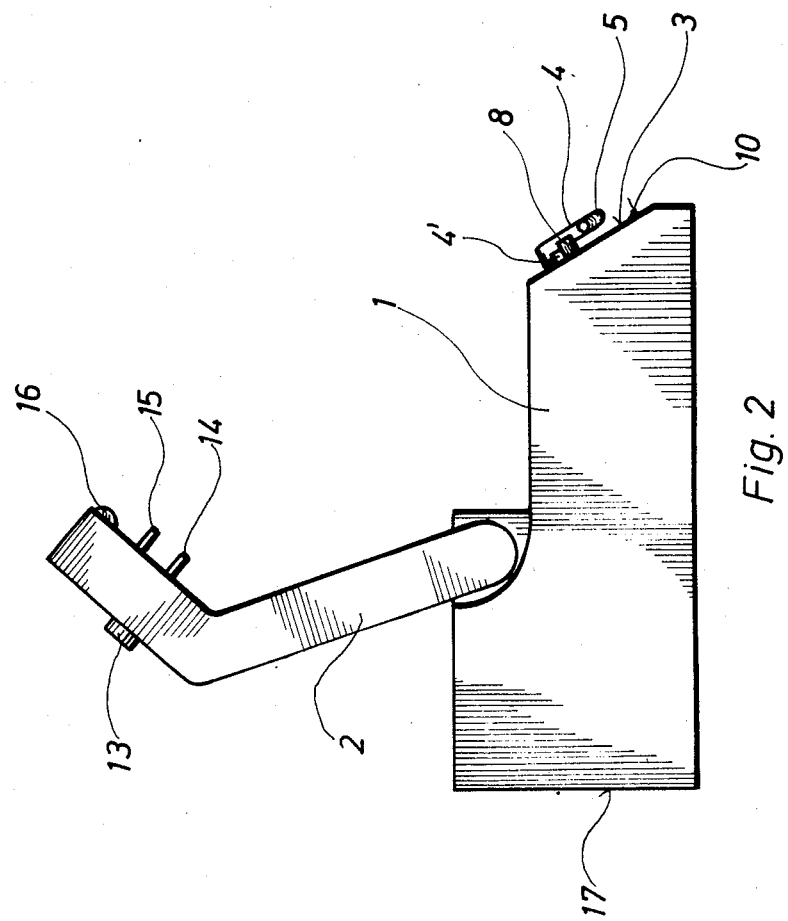
FIG. 2 illustrates a foil welding device in side view.
Figure 4:
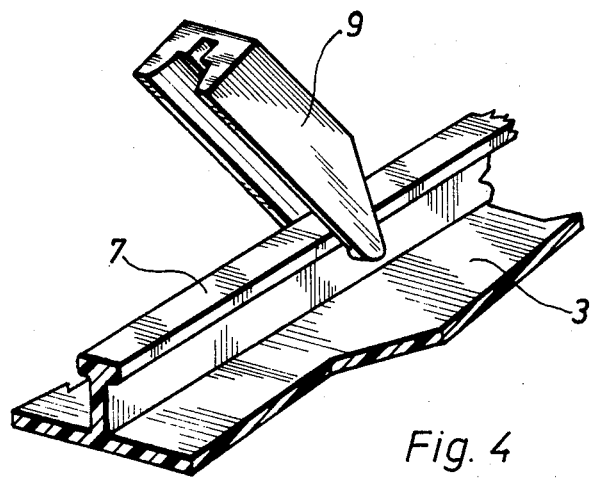
FIG. 4 is a detailed view of the ledge with a strainer in its lifted position.
Figure 3:
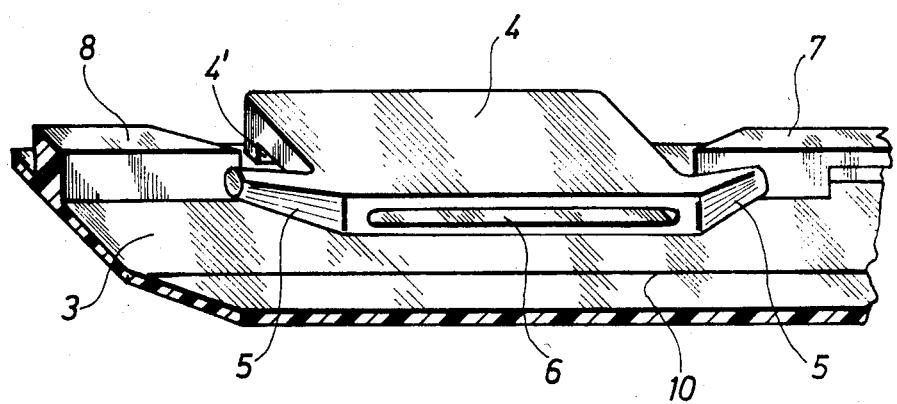
FIG. 3 is a detailed view of the operating surface with a nozzle.

On the rotatably mounted cover 2, shown in FIG. 2, on its front lower edge, a pressing ledge 16 is positioned which when the cover is closed, lies on the welding wire 10 along its whole length. An attachment 15 protrudes from the right side of the cover 2, which, according to its position, coincides with the opening 11 when the cover 2 is closed. Next to attachment 15 is an attachment 14, positioned to coincide with the opening 12, and which passes through the cover 2 to the button 13.

When the foil welding device, according to the invention, is intended for use prior to the welding of the bag, the remaining air is sucked from the bag and the welding device stands positioned on the srface 17, i.e. in an upright position. The side of the thermoplastic bag to be welded is pushed into the slot 4' between the operating surface 3 and the suction head 4.

Figure 5:
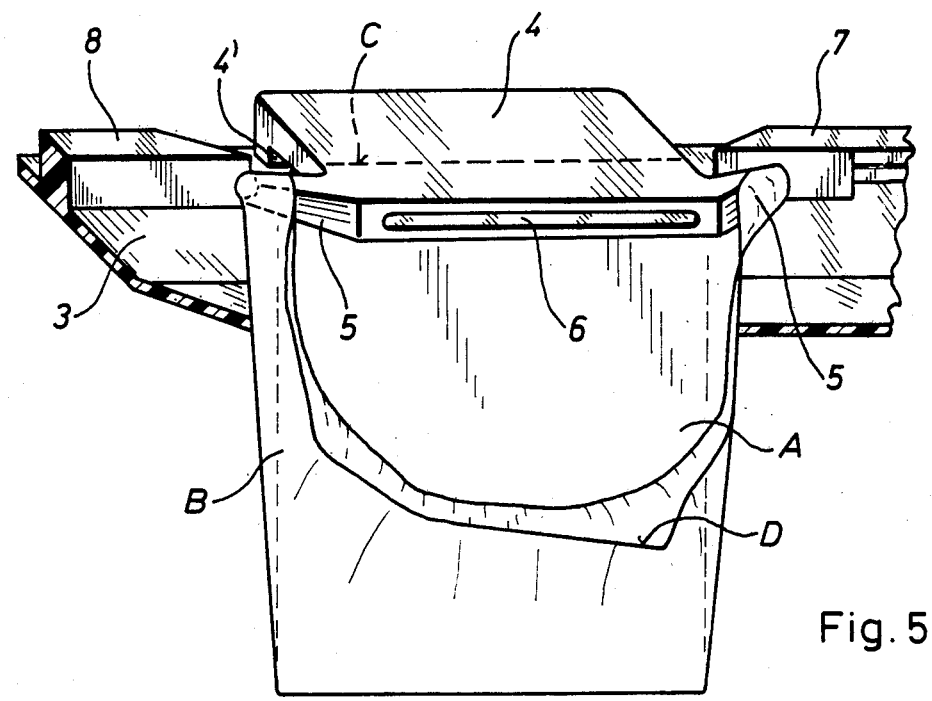
FIG. 5 illustrates a bag being stuck onto the extensions of the nozzle.
Figure 6:
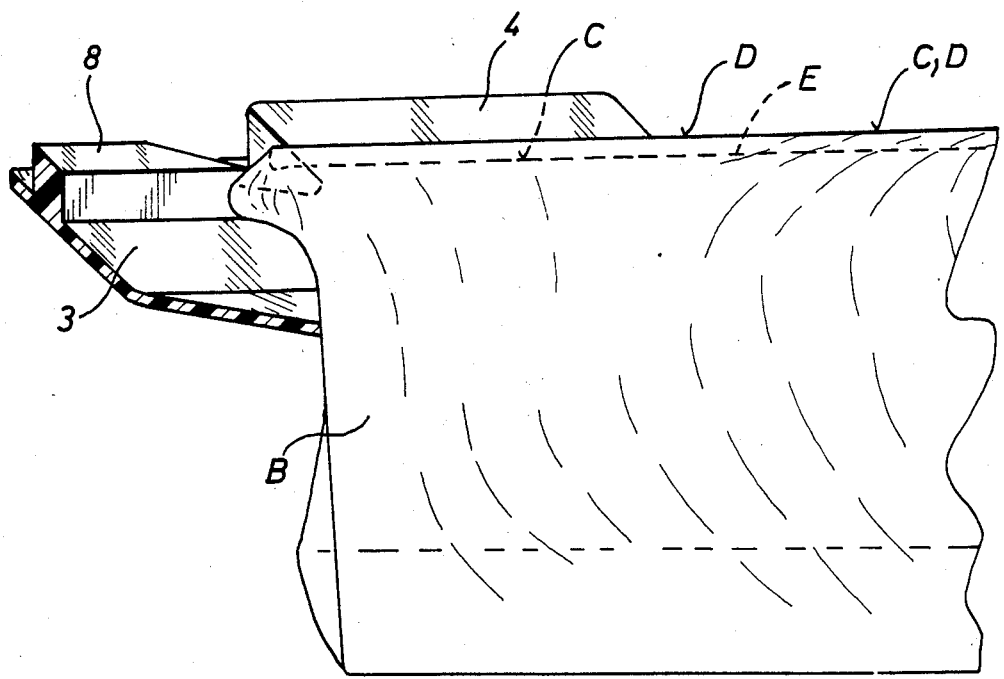
FIG. 6 illustrates a bag being stretched to the right from the nozzle.

In FIG. 5, the side C of the top of the bag, shown in phantom, is located in the slot 4' between the operating surface 3 and suction head 4. The outer side of the bag B is stuck on the extensions 5 of the nozzle 4. A is the inner side of the bag. D is the opposite side of the top of the bag which is stretched away from the nozzle by the operator filling the bag. If the bag is then stretched in such a manner that its opening is approximately horizontal, i.e., in parallel with the surface on which the welding device stands, the side C of the bag is firmly stuck on both extensions 5 so that the bag can be filled. When the bag is sufficiently filled, the left part of the strainer 9 is raised from the sealing ledge 7, the sides of the plastic bag are stretched to the right such that sides C and D of the bag overlap each other so that they lie on the ledge 7, and by pressing down the strainer 9 embraces the foil so that it is fixed to the ledge 7. At this moment both of the sides C and D of the bag, which prior to this formed the openting thereof, lie one against the other except on the suction nozzle 4 which reaches into the bag. That part of the bag which is not filled with material at that moment lies against the operating surface 3 and at the same time also lies on the welding wire 10. This is shown in FIG. 6, where E shows the point at which the opposite sides C and D of the top of the bag are stretched to the right and lie one on top of the other. The bag is held in this orientation by the strainer embracing the furthest extension of the top of the bag. Thereafter the cover 2 is only partially closed and the switch in the opening 12 is activated with the button 13 and the attachment 14. The suction pump which sucks the remaining air from the bag starts to operate. At the conclusion of the suction, the cover 2 is fully pressed towards the housing 1 and the attachment 15 activates the switch in the opening 11 which activates the welding wire 10. During this time the bag is pressed against the welding wire 10 with the aid of the pressing ledge 16 which sees to it that the abutment against the welding wire 10 is uniform and firm enough to provide a reliable weld.

In the case that the suction pump is not intended to be used, the foil welding device, according to the invention, can be used in a lying position, in which the bag does not need to be hung up, the bag only lying on the welding wire 10 and when the cover is closed, lying on the pressing ledge 16 for welding.

From the above statements it is evident that the welding device according to the invention completely solves the aims as set forth and provides a novel construction of all the parts which enable the hanging and stretching of the bag, the invention thereby represents an important advancement in the development of these devices.

What is claimed is:

1. A welding and evacuating device for sealing a thermoplastic bag, said device comprising:
   a housing;
   an operating surface located on the front side of the housing;
   a welding wire extending longitudinally across the operating surface for welding the sides of the top of said bag together;
   suction means projecting from the operating surface adjacent one end of the operating surface for evacuating air from said bag;
   a slot defined between the suction means and the operating surface for receiving one side of the top of the bag;
   an extension protruding from each of two opposed sides of the suction means for holding said one side of the top of the bag in a filling position while the other side of the top of the bag is held by an operator who is filling the bag, the top of the bag thereby being horizontally oriented;
   a cover pivotably mounted on the housing;
   a pressing ledge located on the bottom surface of the cover, the ledge, in a closed condition of the cover, pressing against the welding wire;
   a sealing ledge extending from the suction means to the other end of the operating surface, in parallel with the welding wire;
   a strainer slidably mounted on said sealing ledge, said strainer operating in a raised position and a closed position, said strainer in said raised position being slidable on the ledge, and said strainer in said closed position holding said other side of the top of the bag between the walls of the strainer and the ledge when the top of the bag is stretched across the sealing ledge from said suction means towards said other end of the operating surface, said strainer embracing the furthest extension of the top of the bag to orient the sides of the top of the bag one against the other except for where the suction means is inserted between the sides of the top of the bag;
   means for activating said suction means; and
   means for energizing said welding wire.

2. A foil welding device according to claim 1, characterized in that the operating surface forms an angle of 60° with the housing.

3. A device as claimed in claim 1, further comprising means mounted on said operating surface between said suction means and said one end of the operating surface for locating the top of the bag in said slot.

4. A device as claimed in claim 1, wherein the means for activating said suction means includes a first attachment extending from said cover and a first switch located on said housing for activating a suction source connected to said suction nozzle, said first attachment turning on said first switch when said cover is partially closed, and said means for energizing said welding wire includes a second attachment extending from said cover and a second switch located on said housing for energizing said welding wire, said second attachment turning on said second switch when said cover is fully closed.

* * * * *